May 26, 1931.  A. F. SHORE  1,806,767

APPARATUS FOR MEASURING THE HARDNESS OF MATERIALS

Filed May 23, 1928    3 Sheets-Sheet 1

INVENTOR.
Albert F. Shore
BY
Geo. A. Hoffman
ATTORNEY

May 26, 1931. A. F. SHORE 1,806,767
APPARATUS FOR MEASURING THE HARDNESS OF MATERIALS
Filed May 23, 1928 3 Sheets-Sheet 2

Inventor
Albert F. Shore
By his Attorney
Geo. A. Hoffman

Patented May 26, 1931

1,806,767

UNITED STATES PATENT OFFICE

ALBERT F. SHORE, OF NEW YORK, N. Y.

APPARATUS FOR MEASURING THE HARDNESS OF MATERIALS

Application filed May 23, 1928. Serial No. 279,875.

This invention relates to apparatus for measuring the hardness of materials, and is an improvement upon that shown, described and claimed in my co-pending application filed April 9, 1927, Ser. No. 182,243.

One object of the invention is to provide an elongated one-piece sleeve, the lower portion of which comes in contact with the test specimen and at the upper end of which there is provided spring means for pressing the sleeve downwardly against the test specimen to clamp the latter in position. The sleeve intermediate its ends is provided with perforations on the front and back thereof to permit the assembling and operation of the measuring device.

Another object of the invention is to provide a contractile pressure-bar, preferably of one piece, freely movable in the elongated one-piece sleeve above referred to, and having transverse stressible cross-sections intermediate its ends and being also provided with perforations, similarly as the sleeve mentioned.

Another object of the invention is to provide new and improved compensating means in the assembling of the device, whereby the unavoidable contraction or compression of the superhard indentor-point of the pressure-bar is neutralized.

Another object of the invention is to provide new and improved driving means for furnishing the necessary pressure to successfully operate the measuring apparatus.

The foregoing and other objects of the invention will be hereinafter fully described and claimed and are illustrated in the accompanying drawings in which Figure 1 is a front elevation of an embodiment of my improved hardness measuring machine, in which a portion of the large graduated scale is broken away to show the interior mechanism.

Figs. 5 and 6 are detail views, showing part of the pressure-bar and the preferred method of compensatively mounting the micrometer depth-measuring gage; and Figs. 7 and 8 show a modification of the depth-measuring assembly in which Fig. 7 is a front elevation and Fig. 8 a side view partly in cross-section.

Figures 1, 3:
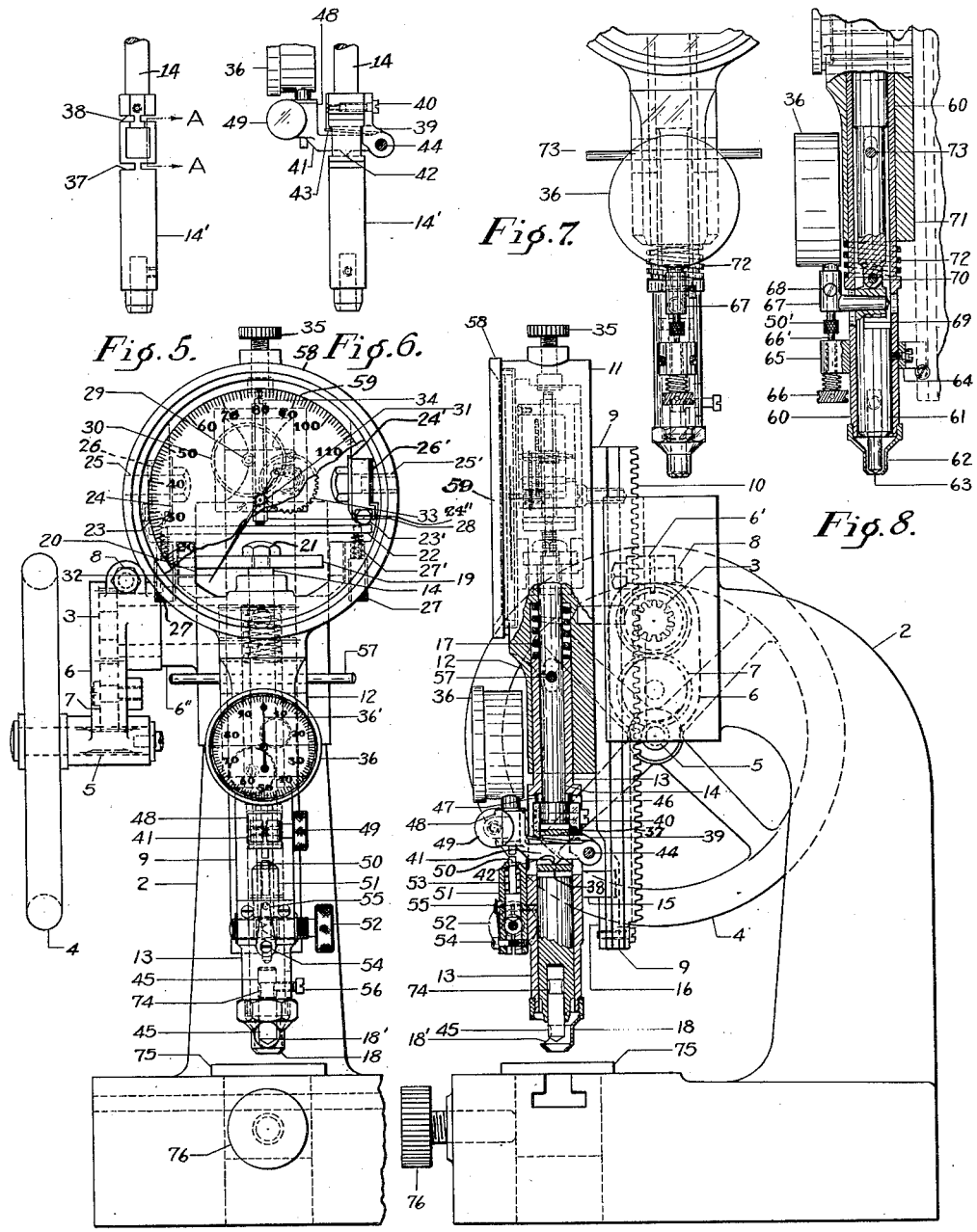
Fig. 3 is a side elevation, partly in cross-section.

Referring to the drawings, the press-frame or support in the apparatus shown is designated by the numeral 2. On the press-frame there is mounted a pinion 3, actuated by a hand-wheel 4 or its equivalent, having a pinion 5 mounted in a swinging adjustable bracket and gear-case 6, which is split at 6' and carries an intermediate reversing idler gear 7. This gear-case 6 is locked into any desired radial position on a reduced part 6" of boss 12 of the casing 11 (Fig. 3), relative to pinion 3, by clamping-screw 8, depending upon the size and dimensions of the specimen or material about to be tested. The dovetail slide-bar 9 is provided with gear-teeth or rack 10. The pressure-indicating mechanism or gage is housed in a casing 11 (Fig. 3), having a boss 12 at its lower end, bored to receive slidably a specimen-clamping and depth-measuring sleeve 13, into which there is fitted slidably a longitudinally moving pressure-bar 14. 15 is a key-block for the sleeve 13, which key-block moves in a key-way in the dove-tail slide-bar 9, to prevent the sleeve from turning. 16 is a vertically-adjustable stop for the key-block 15 to hold it up in place. 17 is a spring for applying downward pressure on the sleeve 13 for clamping down the test specimen and holding it in position through the removable, preferably screw-threaded cap 18 at the lower end of the sleeve 13. 19 (Fig. 2) is a key-arm for the upper end of the pressure-bar 14, sliding in a key-way 20, to prevent the pressure-bar from turning. 21 is a rounded clamping-screw for securing said key 19 to the pressure-bar 14 and also for contacting during the testing operation with the pressure-measuring or resistor-spring 22 and which bears against hardened rollers 23, 23', held in grooved adjustable blocks 24, 24', by set-screws 25, 25', clamping them against removable shims 26, 26'. For holding the said rollers against the outer surfaces of the grooves in the blocks 24, 24', light springs, preferably leaf-springs 24'' are provided, and thus when the plate-spring 22 is flexed under pressure, the rollers 23, 23' will be automatically held in proper position for effective action. It is understood that the plate-spring 22 may be shortened or lengthened and consequently its power increased or decreased, for the purpose of standardizing and checking up with standard weights, by adding to or removing one or more of the shim-pieces 26, 26', from and between the inner side of the blocks 24, 24' and the inner wall of the casing 11. 27 are screws having a reduced stem fitting loosely into holes in the plate-spring 22 and 27' are coiled springs around said reduced stems, for holding the plate-spring 22 in a central position in the casing 11, and also for keeping the plate-spring in a pressure contact with the hardened rollers 23 and 23'. 28 is a small slidable rack-bar engaging with a pinion 29, fastened to a gear 30, actuating the pinion 31, carrying a pointer-hand 32. 33 is an auxiliary gear carrying a hair-spring on its axle, which gear also meshes with pinion 31, serving to keep the rack-bar 28 always in contact with the plate-spring 22. The said rack-bar is hollow and has threaded therein a stem 34 provided with a tongue at its upper end, which engages a groove in the key 35 for the purpose of setting the pressure-indicator mechanism in the casing 11 to zero. This key is normally out of contact with the stem 34; also the pressure-bar 14 with its contacting head 21, is normally out of contact with the plate-spring 22, to permit the setting to zero of the depth-indicator micrometer-gage 36 carried by the pressure-bar 14, that is to say, the pressure-bar 14, together with the gage, etc., rests upon the test specimen only by its own weight so as to avoid undue initial deformation or penetration, particularly in the softer metals. The pressure-bar 14 is provided with a configuration intermediate its ends to impart to it a certain amount of longitudinal elasticity or contractility when subjected to pressure, whereby the unavoidable contraction or compression of the super-hard indentor-point 45 of the pressure-bar, when under pressure, is neutralized. The preferred manner of accomplishing this end consists in the formation of an opening in the pressure-bar, running transversely of the said bar, with grooves near the transverse opening, thus providing transverse stressible cross-sections 37 and 38 (Fig. 5). These cross-sections are shown cross-hatched in Fig. 4 at 37 and 38, taken on the line A—A of Fig. 5. Fig. 6 shows a side elevation of the lower and enlarged part 14' of the pressure-bar 14; also the manner of connecting the offset-bracket 39 with the upper portion of the enlarged part of the pressure-bar by a screw 40, and the hinged lever 41 carried thereby. The said hinged lever rests against the bottom of the said transverse opening through a knife-edge 42 and extends through said opening. Pressure contact is maintained through a spring 43. It will thus be noted that when the upper part of the bar 14 microscopically approaches the lower part, the depth-micrometer holder lever 41 is caused to tilt downwardly in its bearing 44 in bracket 39, whereas the micrometer-holder end on the opposite side tilts upwardly to a predetermined distance equal to the contraction or shortening of the indentor-point 45, when the latter is subjected to intense pressure, especially against the harder metals. The surrounding contacting and clamping sleeve 13 is preferably of one continuous piece, reaching from the contacting, preferably screw-threaded, open cap 18 at its lower end to the clamping pressure-spring 17 at its upper end. To permit assembling and also operation of the device thereafter, the slot perforations are made in the sleeve on the front and back thereof at 46 and 47. After inserting the pressure-bar 14 in the sleeve 13, the bracket 39 is attached to the pressure-bar by the screw 40, the lever 41 is then inserted and pinned at 44. Said lever extends clear through the sleeve 13 and the pressure-bar 14 in the slots formed therein, so that the micrometer-gage is then fitted on to its boss 48 and clamping set-screw 49. 50 is an adjustable stem carried by a small sleeve 51 fastened to the sleeve 13. 52 is a screw provided with a conical contraction for engaging with a cone on the opposite end of stem 50 through which medium adjustment is effected. 53 is a spring within the small sleeve for pressing the conically tipped stem 50 against the conical contraction of screw 52. 54 is a screw for taking up wear on screw 52 and also for holding a small spring 55, provided with a pin for holding stem 50 steady or free from lateral lost motion. 56 (Fig. 1) is a set-screw for holding the indentor-point stem 45 up against its seat in the pressure-bar 14. 57 (Fig. 2) is a projecting bar anchored in the pressure-bar 14, to permit application of auxiliary weights thereon in the event that it is desired to carry on hardness tests on rough work with a greater initial pressure on the indentor-point 45. Slots 57' are provided both in the sleeve 13, in which the pressure-bar moves longitudinally, and in the extension boss 12, so that the projecting-bar 57 may move without touching any of the other parts. 58 is a removable ring with suitable shoulder and groove formed on the inside for holding the glass cover for the graduated dial 59. It is to be understood that the preferred kind of micrometer depth-gage 36 is of the standard type, comprising a parallel movable stem upon which is formed a gear-rack acting on a gear-train and an opposer hair-spring.

Figure 2:
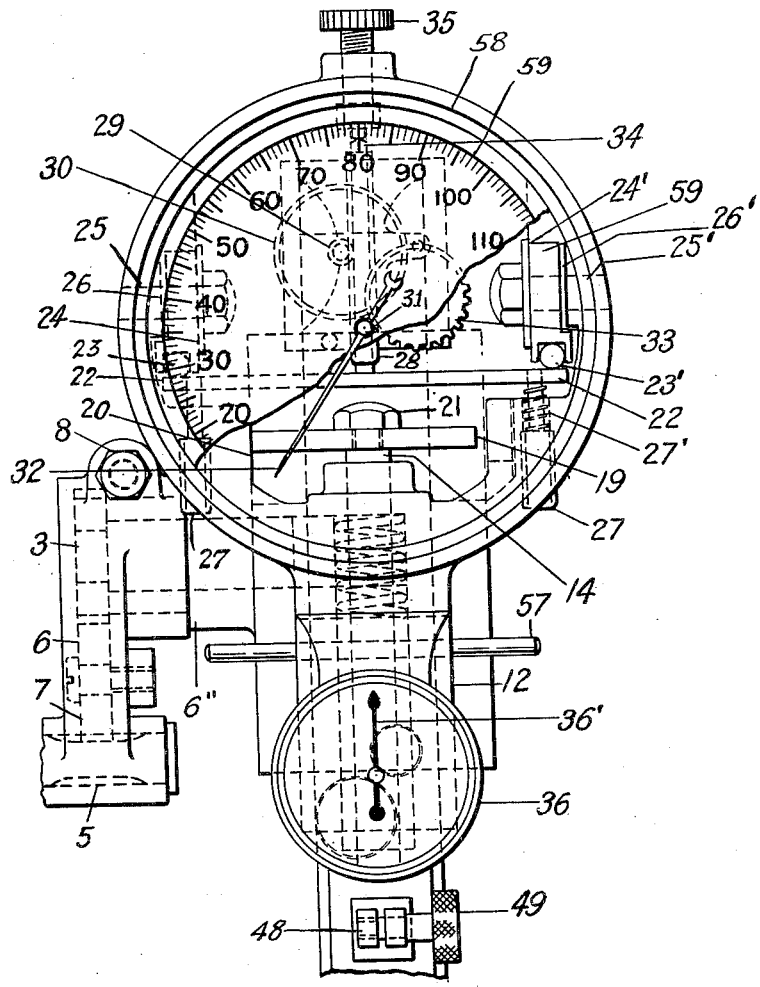
Figure 2 is a view of the upper part of Fig. 1, on a considerably larger scale.

Fig. 7 is a front elevation and Fig. 8 is a side elevation partly in cross-section, showing a modification of the pressure-bar with its clamping and measuring sleeve and also contractile portion of the said pressure-bar which is utilized for the purpose of effecting the desired correction in the depth micrometer gage, previously referred to. In this assembly, 60 is a specimen clamping and depth-measurer sleeve; 61 is the pressure-bar. 62 is a removable contactor cap. 63 is the superhard indentor-point stem. 64 is a guide key attached to sleeve 60 to hold it from turning, whereas 65 is a screw-threaded holder also attached to the sleeve 60, to receive an adjustment-screw 66, to engage the micrometer-stem 50' of the micrometer depth-gage 36, to set it to zero. Said micrometer gage is held in an offset-arm 67, provided with a set-screw 68, to hold the said micrometer, said arm being fastened in a portion of the pressure-bar 61, immediately above a cut-out entering on a side thereof opposite to that facing the back of the micrometer-gage 36. Arm 67 may be fastened in this portion in any suitable manner, one of which is a drive-in taper, as illustrated. Slot openings are provided in the sleeve 60 to permit insertion of arm 67 after having inserted pressure-arm 61 in sleeve 60; also for driving out the taper shank of arm 67. The bar 61 is made of tempered spring metal, so that the reduced offset portion 69 will flex toward the axis of pressure-bar 61, with the result that arm 67 with its micrometer 36 will be tilted upwardly and away from adjustable screw-stem 66', when high pressure is applied to bar 61. 70 is a flexible joint connecting the lower portion of pressure-bar 61 with the upper portion thereof and which extends through sleeve 60 (not shown) to engage with the pressure-measuring plate-spring 22, shown in Figs. 1, 2 and 3. 71 is a sleeve-bearing for sleeve 60. 72 is a spring for providing downward pressure for sleeve 60 for clamping down the test specimen through the medium of contactor-cap 62. 73 is an auxiliary weight-carrier bar attached to pressure-bar 61, the same as shown in the assemblies of Figs. 1, 2 and 3. In either form of construction of the pressure-bar system, a portion of the inserted indentor-point stem 45 is reduced as at 74 (Fig. 4), to provide a certain amount of contractility to offset different kinds of penetrator points which would have less contractile error than a jewel point which it is necessary to use against hardened steel test specimens.

By reference to Figs. 1 and 3, it will be seen that a base 75 is provided, having means for permitting the attachment thereon of auxiliary holding devices for test specimens. A set-screw 76 is shown for holding the base 75 in fixed position.

Figure 4:
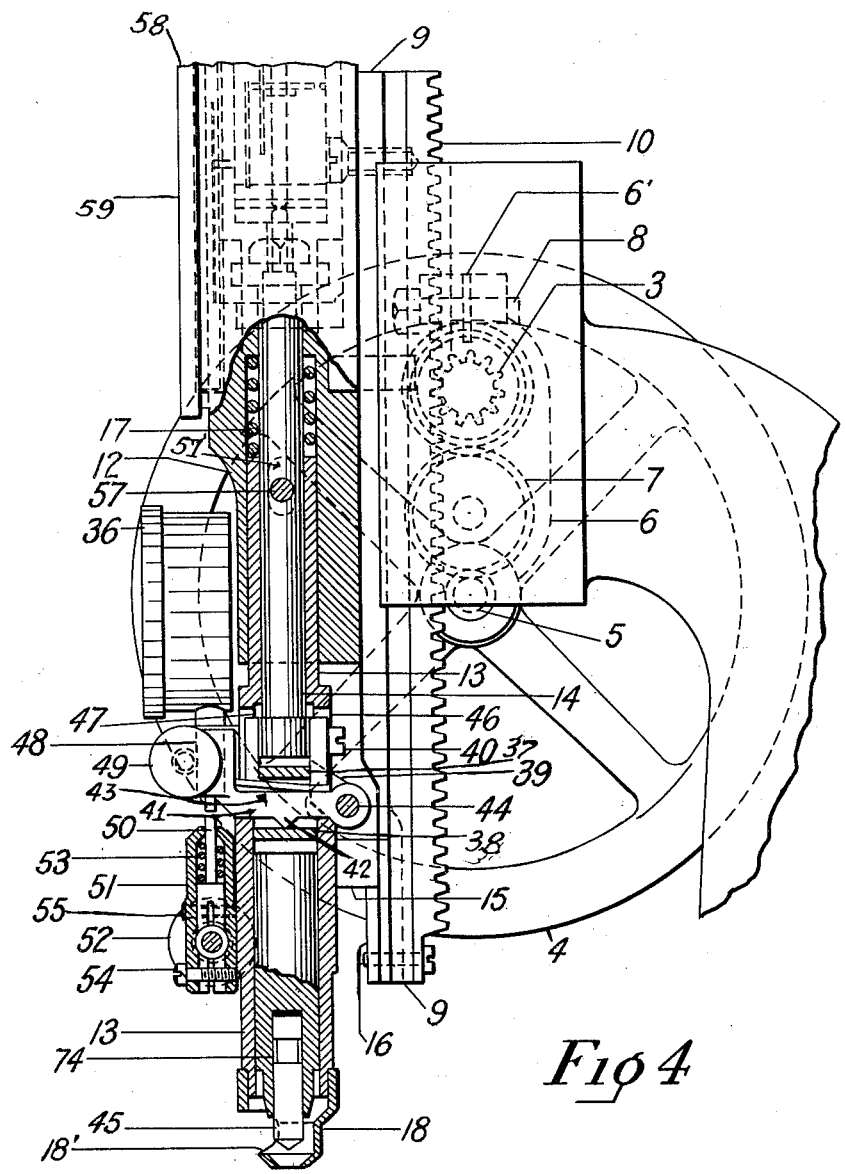
Fig. 4 is a view of the lower part of Fig. 3, on a considerably larger scale.

The operation is as follows:

When pressure is applied to the movable pressure-gage or weigher-head and associated parts, to be communicated eventually to the specimen under test, this is accomplished through the medium of the handwheel 4, or its equivalent, pinion 3 and rack 10, and thence communicated to the slide-bar 9, and the casing or housing 11, which with its appendage or boss 12 carries, moving freely therein, the depth-measuring assembly, and although this is adapted to press against the pressure-measurer or plate-spring 22 during the operation of hardness testing, it is normally out of contact. When the pressure-measuring unit 11 is moved toward the test specimen in the manner as set forth, the open cap 18 contacts first and also serves to clamp the specimen against the anvil plate 75 under pressure of spring 17. As the pressure-head 11 advances further, it will move the indicator hand 36' of the depth-gage 36 until the indentor-stem 45 contacts with the test specimen also. It then comes to rest preparatory to setting said depth-gage hand to zero through the medium of the thumb-screw 52 (Fig. 4). Before the indentor-stem does contact with the test specimen, however, the portion to be tested may be observed and located through suitable openings in the cap 18 at 18'. Having thus set the indicator-hand of the depth-gage 36 to zero, the pressure-measuring unit 11 is still further advanced toward the test specimen until the upper part of the pressure-bar 14, terminating with the rounded clamping-screw 21, approaches and contacts with the pressure-measuring or plate-spring 22. Immediately, as contact is thus made, both the pressure-indicator-hand 32 and the depth-gage indicator-hand 36' move simultaneously, the latter showing units of depth of penetration and the former showing the amount of pressure required to cause such penetration. For standard hardness measurement a predetermined depth of penetration is desirable, hence on all test specimens the depth readings are required to show such a predetermined value. In other words, it becomes a constant factor, leaving the pressure-gage to show the variable factor, or in other terms, the hardness value of the specimen. In the operation of my improved hardness measuring machine it is not limited to the manner described but it may be operated in a reverse manner, that is, a constant pressure may in some instances be desirable so that the variable readings are taken from the depth-gage. This is particularly desirable in detecting the flow point in the soft metals. In the measurement of hard metals in which it is desirable to take constant depth values with the micrometer-gage 36, this would ordinarily be impracticable because of the inevitable shortening of a reduced penetrator-point, which may be either a hardened steel ball or a jewel, such as a diamond. That is, the micrometer-gage could not distinguish between actual penetration and the simultaneous elastic contraction of the pressure-bar or the indentor-point. To eliminate this deception, I incorporate the compensating feature previously described. It has been noted that while the pressure-bar 14 carries the micrometer 36, it is not rigidly fastened to it, that is, it is subject to microscopic movement longitudinally thereto. The operation of this feature depends upon the tilting of an offset arm or lever as indicated at 41 in Figs. 1, 2, 3 and 6 and at 67 in Figs. 7 and 8. As a result of part of the said pressure-bar 14 contracting to a predetermined degree per unit of pressure applied the total contraction after being transmitted to the end of the tilting arms or levers 41 and 67 will equal the total contraction of particularly a diamond indentor-point. In the preferred form of compensator feature as illustrated in Figs. 1, 2, 3, 4, 5 and 6 the upper section of the pressure-bar 14 that is the part above the compensator-arm 41, best illustrated in Fig. 6, approaches the lower portion 14' of the pressure-bar, or below the compensator-arm 41. The said arm or lever 41 has one end pivoted in a bracket 39 attached to the upper portion of the pressure-bar and which lever rests in the middle part thereof on the lower portion of the pressure-bar, against which it is held by a spring 43 (see Fig. 6). The effect will then be for the free end of the lever holding the micrometer to be tilted upward, in other words, away from the test specimen, whereas the contraction of the indentor-point is in the direction toward the test specimen. This, then, results in a neutralization of the error; that is, for each unit of contraction in the indentor-point, the micrometer recedes a similar unit, with the result that the depth measurements indicated thereon are so correct and dependable that a straight pressure and depth increment line may be plotted on a stress strain chart, and in that way qualitative and quantitative hardness may be faithfully measured.

It is understood that the vital unit of my improved hardness measuring machine may be mounted in a fixed position on its press-frame or support and the pressure applied through any suitable means from below, in which instance the table carrying the test specimen will be movable, without departing from the spirit of my invention or the scope of the appended claims. In that instance, the general mechanism of the pressure apparatus would remain and operate the same. The preferred method, however, is to have the table fixed and to have the vital mechanism movable relative thereto. The said vital mechanism is a complete and independent operable mechanism and may be used with equal facility when detached from its press-frame or support and mounted, for example, in a drill-press chuck, etc. The pressure-bar with its micrometer depth measuring system, its contacting and clamping sleeve and its upper casing or housing, form a complete depth-measuring unit and may be operated independently of the pressure mechanism shown, so that the test specimen may be placed upon a weighing-scale and which would indicate the pressure required to cause a given depth of penetration in the test specimen. The pressure-bar may be made solid and without the compensating or corrective means for the micrometer, as for working in very soft materials. For harder materials, however, the compensator means is desirable and necessary. There are many ways of introducing the contractile feature which through the reversing means serves to move the micrometer away from false depth registration, the simplest being an offsetting part of the cross-section of the bar and consequently of the line of pressure in the pressure-bar, as indicated in Figs. 7 and 8, which causes a certain amount of bending thereof and a drawing away of the arm holding the micrometer-gage from the adjustable micrometer-actuating member. This, however, would not in some instances answer the purpose or ordinarily be good mechanics, hence a more elaborate method may be desirable, such as is shown in detail in Figs. 5 and 6, and also in the assembly of Figs. 1, 2, 3 and 4. The contractile feature may be a stiff spring within a telescopic device, as shown in the previous application above mentioned, or a contractile one-piece pressure-bar or spring unit, as clearly illustrated in Figs. 1, 2, 3, 4, 5 and 6, in which instance the offset micrometer arm 67 in Figs. 7 and 8 is in the form of a pivoted lever, mounted and held responsive to microscopic contraction movements due to the shortening of such a pressure-bar, by a suitable stiff spring either attached to the lever or on to the bar itself so as to press on the lever, without departing from the spirit of the invention.

I claim:

1. In a hardness measuring device, the combination with a press-frame, means carried by the press-frame, said means being adapted to apply pressure to the hardness measuring device, means for measuring the pressure applied, a longitudinally movable pressure-bar, one end being provided with a superhard indentor-point and the other end being adapted to press against the pressure-measuring means, a member surrounding the pressure-bar and moving parallel with and relatively thereto, one end of said member being adapted to contact with the surface of the test specimen, spring means adapted to press said member downwardly for clamping down the said test specimen, depth-measuring means carried by the pressure-bar, and adjustable means on the surrounding member adapted to actuate the depth-measuring means for setting the same to zero.

2. In a hardness measuring device, the combination with a press-frame, means carried by the press-frame, said means being adapted to apply pressure to the hardness measuring device, means for measuring the pressure applied, a casing for housing the pressure measuring means and having a boss at its lower end, a longitudinally movable pressure-bar, one end being provided with an insert stem having a superhard indentor-point, and the other end being adapted to press against the pressure measuring means, a member surrounding the pressure-bar and moving longitudinally parallel with and relatively thereto in the boss of the casing, one end of said member being adapted to contact with the surface of the test specimen, spring means adapted to press said surrounding member downwardly for clamping down the said test specimen, depth-measuring means carried by the pressure-bar, and adjustable means on the surrounding member adapted to actuate the depth-measuring means for setting the same to zero.

3. In a hardness measuring device, the combination with a press-frame means carried by the press-frame, said means being adapted to apply pressure to the hardness measuring device, means for measuring the pressure applied, a casing for housing the pressure-measuring means and having a boss at its lower end, a longitudinally movable pressure-bar, one end being provided with a removable superhard indentor-point stem and the other end being normally out of contact with the pressure measuring means but adapted to press against said means during a hardness test, a sleeve member surrounding the pressure-bar and moving longitudinally parallel with and relatively thereto in the boss of the casing, one end of said sleeve member having an open removable cap adapted to contact with the surface of the test specimen, spring means adapted to press said sleeve downwardly for clamping down the said test specimen, depth-measuring means carried by the pressure-bar, and adjustable means on the sleeve member adapted to actuate the depth measuring means for setting the same to zero.

4. In a hardness measuring device, the combination with a press-frame, means carried by the press-frame, said means being adapted to apply pressure to the hardness measuring device, means for measuring the pressure applied, a longitudinally movable pressure-bar having at one end a removable stem with a superhard indentor-point and the other end being adapted to press against the pressure measuring means, said other end being normally out of contact with said means, contractile means in said pressure-bar intermediate its ends, depth measuring means carried by the pressure-bar, and means for reversing the direction of contraction relative to the depth measuring means, to offset the unavoidable contraction in the superhard indentor-point under pressure for correcting the error otherwise shown in the depth measuring means due to the said contraction of the superhard indentor-point.

5. In a hardness measuring device, the combination with a press-frame, means carried by the press-frame, said means being adapted to apply pressure to the hardness measuring device, means for measuring the pressure applied, a longitudinally movable pressure-bar having at one end a superhard indentor-point and the other end being adapted to press against the pressure measuring means, said other end being normally out of contact with said means, contractile means in said pressure-bar intermediate its ends, depth measuring means carried by the pressure-bar, means for reversing the direction of the unavoidable contraction of the superhard indentor-point relative to the depth measuring means, a sleeve moving relative to the pressure-bar for contacting with and clamping down the test specimen, and screw-threaded adjustable means on said sleeve for adjusting the depth-measuring means to zero.

6. In a hardness measuring device, the combination with a press-frame, means carried by the press-frame, said means being adapted to apply pressure to the hardness measuring device, means for measuring the pressure applied, a longitudinally movable pressure-bar having at one end a superhard indentor-point and the other end being adapted to engage the said pressure means, contractile means in said pressure-bar intermediate its ends, depth measuring means carried by the pressure-bar, said means having a fixed stem, means for reversing the direction of the unavoidable contraction of the superhard indentor-point relative to the depth-measuring means, said first-named means consisting of an off-set arm provided with a boss and set screw for holding the fixed stem of the depth-measuring means, a sleeve moving relative to the pressure-bar for contacting with and clamping down the test specimen, and screw-threaded adjustable means on said sleeve for adjusting the depth-measuring means to zero.

7. In a hardness measuring device, the combination with a press-frame, means carried by the press-frame, said means being adapted to apply pressure to the hardness measuring device, a pressure-gage for measuring the pressure applied, a longitudinally movable pressure-bar having at one end a removable stem with a superhard indentor-point and a set-screw for holding the stem firmly in position in the pressure-bar, and the other end of the pressure-bar being adapted to engage the said pressure means, said other end having anchored therein a projecting-bar to permit the application of auxiliary weights thereon, contractile means in said pressure-bar intermediate its ends, a depth-gage carried by the pressure-bar and having a fixed stem, a surrounding sleeve moving relative to the pressure-bar for contacting with and clamping down the test specimen, and screw-threaded adjustable means on said sleeve for adjusting the depth-gage to zero.

8. In a hardness measuring device, the combination with a press-frame, means carried by the press-frame, said means being adapted to apply pressure to the hardness measuring device, means for measuring the pressure applied, a longitudinally movable pressure-bar having at one end a superhard indentor-point and the other end being adapted to engage the pressure means, contractile means in said pressure-bar intermediate its ends, said means consisting of an opening running transversely of the pressure-bar, grooves near said transverse opening, depth-measuring means carried by the pressure-bar, said means having a fixed stem, means for reversing the direction of the inevitable contraction of the superhard indentor-point relative to the depth-measuring means, said first-named means consisting of an off-set bracket secured to the pressure-bar by means of a screw, a lever pivoted on one end in said bracket, said lever having a knife-edge bearing and also having a boss and a set-screw, a surrounding sleeve moving relative to the pressure-bar for clamping down the test specimen, and screw-threaded adjustable means on said sleeve for adjusting the depth-measuring means to zero.

9. In a hardness measuring device, the combination with a press-frame, means carried by the press-frame, said means being adapted to apply pressure to the hardness measuring device, means for measuring the pressure applied, a longitudinally movable pressure-bar having at one end a superhard indentor-point and the other end being adapted to engage the pressure means, contractile means in said pressure-bar intermediate its ends, said means consisting of an opening running transversely of the pressure-bar, grooves near said transverse opening, depth-measuring means carried by the pressure-bar, said means having a fixed stem, means for reversing the direction of the inevitable contraction of the superhard indentor-point relative to the depth-measuring means, said first-named means consisting of an off-set bracket secured to the pressure-bar by means of a set-screw, a lever pivoted on one end in said bracket, said lever having a knife-edge bearing and a spring for causing downward pressure, said lever also having a boss and a set-screw, a surrounding sleeve moving relative to the pressure-bar for clamping down the test specimen, said sleeve having spring means at its upper end for exerting a downward pressure and having at its lower end a screw-threaded removable cap having an opening at its bottom and also having an opening at its side, and screw-threaded means on said sleeve for adjusting the depth-measuring means to zero.

10. In a hardness measuring device, the combination with a press-frame, adjustable means carried by the press-frame, said means being adapted to apply pressure to the hardness measuring device, means for measuring the pressure applied, means for adjusting said last-named means to zero, a casing for housing the pressure-measuring means, said casing also having therein a key-way, a longitudinally movable pressure-bar having an indentor-point at one end and a key-arm at the other end, said key-arm being adapted to slide in the key-way of the casing, to prevent the pressure-bar from turning, a surrounding sleeve movable relatively to the pressure-bar, depth-measuring means carried by the pressure-bar, means carried by the surrounding sleeve to actuate the depth-measuring means, and means for adjusting the last-named means to zero.

11. In a hardness measuring device, the combination with a press frame, adjustable means carried by the press-frame, said means being adapted to apply pressure to the hardness measuring device, means for measuring the pressure applied, means for adjusting said last-named means to zero, a casing for housing the pressure-measuring means, said casing also having therein a key-way, a longitudinally movable pressure-bar having an indentor-point at one end and a key-arm at the other, said key-arm being adapted to slide in the key-way of the casing to prevent the pressure-bar from turning, a surrounding sleeve movable relatively to the pressure-bar, said sleeve having means attached thereto to prevent the sleeve from turning, depth-measuring means carried by the pressure-bar, means carried by the surrounding sleeve to actuate the depth-measuring means, and means for adjusting said last-named means to zero.

12. In a hardness measuring device, the combination of a press-frame, a pinion mounted thereon, adjustable means for actuating said pinion, a movable slide-bar having a rack meshing with the pinion carried by the press-frame, said slide-bar having a key-way at its lower end, a pressure-gage carried by the slide-bar, a plate-spring for said gage, means for regulating the power of said plate-spring, a longitudinally movable pressure-bar normally out of contact with the said plate-spring, a depth-gage mounted on the pressure-bar, a surrounding sleeve movable relatively to the pressure-bar, said sleeve having a key-block adapted to slide in the key-way carried by the slide-bar, to prevent the sleeve from turning, and adjustable means carried by the sleeve for adjusting the depth-gage to zero.

13. In a hardness measuring device, the combination with a press-frame, a pinion mounted thereon, adjustable means for actuating said pinion, a movable slide-bar having a rack meshing with the pinion carried by the press-frame, said slide bar having a keyway at its lower end, pressure-measuring means carried by the slide-bar, a plate-spring for said pressure-measuring means for regulating the power of said plate-spring, consisting of adjustable rollers mounted in grooved blocks, spring means for holding the plate-spring in contact with the said rollers, a contractile pressure-bar, depth-measuring means carried thereby, means for setting to zero the said depth-measuring means, a sleeve surrounding said pressure-bar, said sleeve having a key-block at its lower end to slide in the keyway of the slide-bar to keep the sleeve from turning, and means for actuating the depth-measuring means.

14. In a device of the class described the combination with a press frame having means for exerting pressure, said means including a hand wheel, a pinion for the hand wheel, a swinging adjustable arm for the pinion, an intermediate reversing gear in said arm, said arm being anchored and adjustable concentric with the boss bearing of a second pinion which has a larger gear meshing with the said intermediate gear for the purpose of multiplying pressure, said second named pinion engaging with a movable slide bar having a rack and carried by said press frame and carrying a pressure measuring gage, said pressure measuring gage consisting of an adjustable resistor spring, a small slidable rack bar engaging with said resistor spring and adapted to actuate a multiplying gear train terminating in a movable pointer hand for indicating pressure units on graduations of a dial, said small rack bar having an adjustable screw for setting the pointer hand to a predetermined starting point, a detachable key for operating said adjusting screw, an opposer hair spring and gear for acting directly on the pointer hand pinion for the purpose of keeping said small rack bar in contact with and responsive to movements of the resistor spring, a pointed pressure bar for penetrating test specimens when under pressure with a depth measurer assembly for engaging with said resistor spring substantially as described.

15. In a device of the class described the combination with a press frame having means for exerting pressure, said means including a hand wheel, a pinion for the hand wheel, a swinging adjustable arm for the pinion, an intermediate reversing gear in said arm, said arm being anchored and adjustable concentric with the boss bearing of a second pinion which has a larger gear meshing with the said intermediate gear for the purpose of multiplying pressure, said second named pinion engaging with a movable slide bar having a rack and carried by said press frame and carrying a pressure measuring gage, said pressure measuring gage consisting of an adjustable resistor spring, a small slidable rack bar engaging with said resistor spring and adapted to actuate a multiplying gear train terminating in a movable pointer hand for indicating pressure units on graduations of a dial, said small rack bar having an adjustable screw for setting the pointer hand to a predetermined starting point, a detachable key for operating said adjusting screw, an opposer hair spring and gear for acting directly on the pointer hand pinion for the purpose of keeping said small rack bar in contact with and responsive to movements of the resistor spring, a pointed pressure bar for penetrating test specimens when under pressure with a depth measurer assembly for engaging with said resistor spring, and having a compensating means interposed for correcting contractile errors in the indentor point substantially as described.

In testimony whereof, I affix my signature.

ALBERT F. SHORE.